US005542101A

United States Patent [19]

Pal

[11] Patent Number: 5,542,101

[45] Date of Patent: Jul. 30, 1996

[54] METHOD AND APPARATUS FOR RECEIVING SIGNALS IN A MULTI-PATH ENVIRONMENT

[75] Inventor: Debajyoti Pal, Middletown, N.J.

[73] Assignee: AT&T Corp., Murray Hill, N.J.

[21] Appl. No.: 154,773

[22] Filed: Nov. 19, 1993

[51] Int. Cl.[6] .................... H04B 1/10

[52] U.S. Cl. .................... 455/65; 455/52.3; 455/63; 455/273; 455/276.1; 455/278.1

[58] Field of Search .................... 455/65, 52.1, 52.3, 455/63, 273, 277.1, 276.1, 277.2, 278.1; 342/59, 148

[56] References Cited

U.S. PATENT DOCUMENTS 4,112,430 9/1978 Ladstatter .................... 455/273
5,274,844 12/1993 Harrison et al. .................... 455/276.1

OTHER PUBLICATIONS

"Adaptive Equalization for TDMA Digital Mobile Radio" by John G. Proakis, IEEE Transactions on Vehicular Technology, vol. 40, No. 2, May 1991, Piscataway, New Jersey.

*Primary Examiner*—Reinhard J. Eisenzopf
*Assistant Examiner*—Doris To
*Attorney, Agent, or Firm*—Christopher N. Malvone

[57] ABSTRACT

Signals from multiple signal paths are received using a multi-element antenna and a beam-forming network. Signals from each of the antenna elements are sampled to form a sample vector. Several sample vectors are used to form an auto-covariance matrix. A singular value decomposition of the auto-covariance matrix is used to form three matrices. The first matrix is used to determine the number of signal paths and the second matrix is used to form several polynomials. The polynomial roots that are on or near the unit circle are used to determine points on the unit circle that are associated with each signal path. Each point on the unit circle is used to calculate weights for a beam-forming network that forms a receive beam for each signal path.

2 Claims, 5 Drawing Sheets

METHOD AND APPARATUS FOR RECEIVING SIGNALS IN A MULTI-PATH ENVIRONMENT

BACKGROUND OF THE INVENTION

1. Field of the Invention

The present invention relates to wireless communications; more specifically, to communications in a multi-path environment.

2. Description of the Prior Art

Many communications systems such as cellular systems and TDMA (Time Division Multiple Access) systems suffer from a performance loss which results from multiple signal paths between a receiver and transmitter. This problem is often referred to as intersymbol interference in communication systems that transmit information using symbols. Prior communication systems address this problem using a receiver that includes an adaptive equalizer which compensates for channel conditions such as multi-path conditions. Adaptive equalization techiques are discussed in "Adaptive Equalization for TDMA Digital Mobile Radio", J. G. Proakis, IEEE Transactions on Vehicular Technology, pp. 333–41, Vol. 40, No. 2, May 1991. When a system includes moving receivers, such as a receiver in an automobile, channel conditions may change relatively quickly and result in improper compensation by the receiver's equalizer. For example, an automobile's motion may result in improper compensation by losing or gaining signal paths at a rate that is faster than the rate at which the equalizer can adapt. As a result, when a signal path is lost, a receiver's performance is degraded by both the improper compensation of the receiver's equalizer and by the loss of signal power provided by the lost signal path, and when a signal path is gained, improper compensation may result in inter-symbol interference.

SUMMARY OF THE INVENTION

The present invention reduces interference resulting from multiple signal paths by separating signals that arrive via different paths, time aligning the signals and adding the signals to maximize the output signal-to-noise ratio. The invention uses signals from multiple antenna elements to determine the angles of arrival of each signal path. It also uses a beam-forming network to form receive beams corresponding to the angles of arrival.

When a receiver embodying the present invention encounters a loss of a signal path, it loses the signal power associated with that path, but avoids the additional performance loss that results from improper compensation by an equalizer. In addition, when a new signal path is encountered, the additional path does not result in inter-symbol interference.

DETAILED DESCRIPTION

Figure 1:
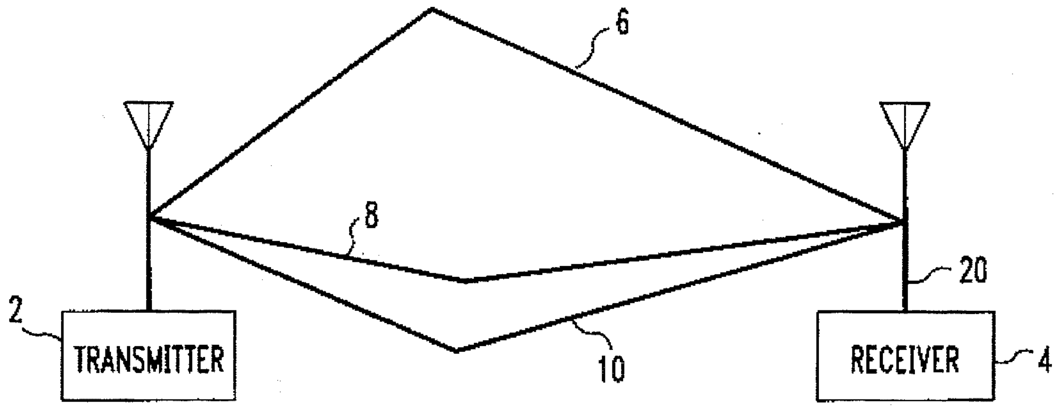

FIG. 1 illustrates transmitter 2 transmitting a signal to receiver 4 in a multi-path environment having n paths where, for example, n=3. The multi-path environment produces signal paths 6, 8 and 10 to receiver 4. Since the paths have different lengths, the signals from the paths are received by receiver 4 at slightly different times. The differing arrival times can cause interference such as inter-symbol interference.

Figure 2:
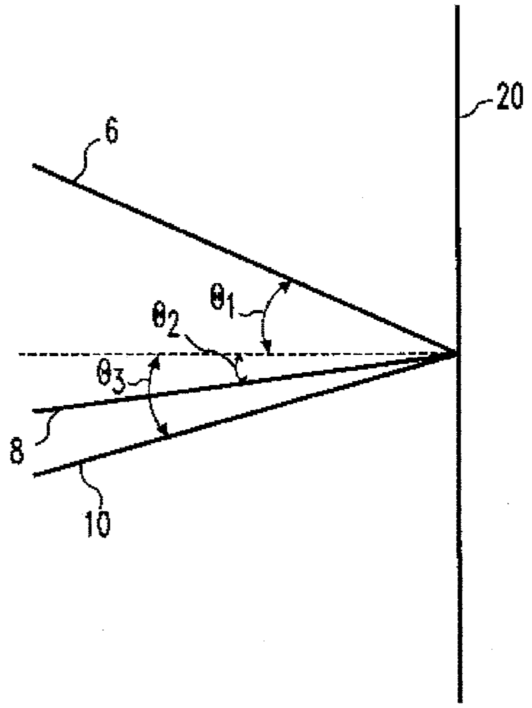

FIG. 2 illustrates antenna 20 of receiver 4, and the angles of arrival of signals that traveled along paths 6, 8 and 10. In this example, the angle of arrival is measured with respect to a line that is normal to antenna 20. The present invention compensates multiple signal paths by determining the angles of arrival, $\theta_1$ through $\theta_3$, of the three signal paths, and by using a beam-forming network to selectively receive one or all three of the signals from the signal paths. If the beam-forming network is used to receive only one signal, the path with the strongest signal or highest signal-to-noise ratio is selected, and provided as an output. If it desirable to increase the output signal-to-noise ratio, the signals from the three paths are time aligned and added to produce an output signal with an increased signal-to-noise ratio. The signals are time aligned by choosing the strongest signal and then correlating the other two signals with data or a training sequence in the strongest signal. The correlation determines the misalignment of the three signals so that they can be time aligned and added to increase the output signal-to-noise ratio.

Figure 3:
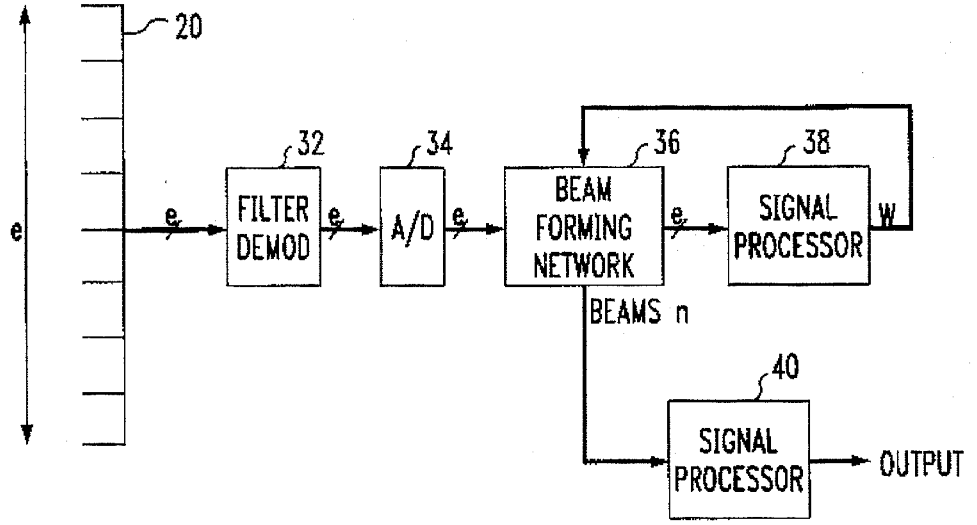

FIG. 3 includes multi-element antenna 20 having e elements. The number of elements e should be greater than or equal to the maximum number of expected signal paths plus one. Each of the elements provide an output to filter/demodulator 32. The signals from filter/demodulator 32 pass to (analog to digital converter) A/D 34 and then to beam-forming network 36. The outputs of beam-forming network 36 are passed to signal processor 38 which determines the number of signal paths and their associated angles of arrival. Processor 38 can be implemented using devices such as a microprocessor or a DSP (Digital Signal Processing) device. Weight values relating to the angles of arrival are passed from processor 38 to beam-forming network 36. Beam-forming network 36 forms a receive beam for each angle of arrival and produces outputs corresponding to each receive beam. Beam-forming network 36 can be implemented using the same type of devices used to implement processor 38. It is also possible to implement processor 38 and beam-forming network 36 using the same device.

Figure 4:
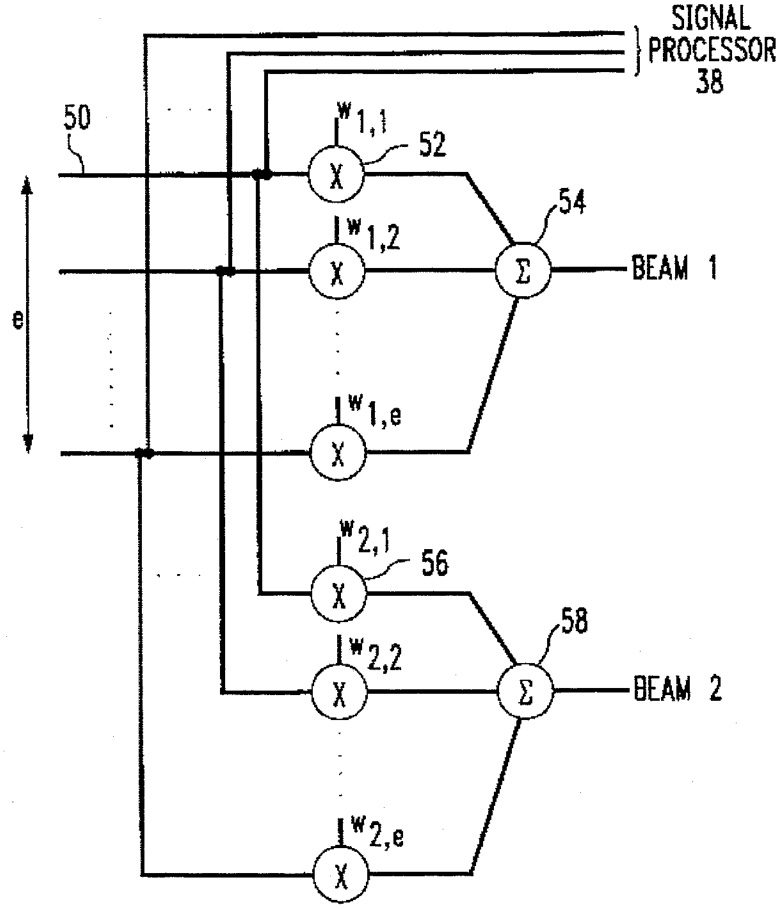

FIG. 4 illustrates beam-forming network 36. Beam-forming network 36 is well-known in the art and produces the different receive beams by multiplying the outputs of A/D 34 by a weight W, and by summing the resulting products to form a receive beam. Several of these operations can be formed in parallel to produce a large number of receiving beams. Each input 50 receives a signal from an element of antenna 20 via filter/demodulator 32 and A/D 34. One set of inputs 50 are passed to processor 38. In addition, each input 50 is passed through a multiplier 52 where the input is multiplied by a weight W. The outputs of multiplier 52 are passed through summer 54 to form a receive signal that corresponds to a receive beam. Similarly, multipliers 56 and summer 58 are used to produce a second receive beam. Additional receive beams can be produced in a similar fashion. Methods for choosing weights W so that a receive beam selectively receives a signal arriving from a particular angle of arrival are well-known in the art.

The outputs from beam-forming network 36, which correspond to the receive beams, are passed to signal processor 40. Processor 40 can choose the strongest signal from the receive beams and provide that signal as an output. Processor 40 can be implemented using devices such as a microprocessor or DSP device. Processor 40 can also be implemented using the same device that is used to implement processor 38 and/or beam-forming network 36.

It is also possible for signal processor 40 to correlate the strongest signal with each of the weaker signals from the other receive beams to determine the time skew between the strongest signal and the weaker signals. Using this information, signal processor 40 can time align the received signals and add them to produce an output signal with a higher signal-to-noise ratio.

The output of A/D converter 34, which is passed to processor 38 via beam-forming network 36, is in the form of equation 1 which illustrates a received vector.

$$Y_k = \begin{bmatrix} y_{1,k} \\ y_{2,k} \\ y_{3,k} \\ \cdot \\ \cdot \\ \cdot \\ y_{e,k} \end{bmatrix} \quad (1)$$

The received vector $Y_k$ contains samples from each of the e elements of antenna 20 for time k. These samples may be complex values, if for example, a quadrature amplitude modulated signal is received. This procedure is carried out until L samples have been collected where L is≧e. For each received vector $Y_k$, matrix $R_k$ is formed in accordance with Equation 2.

$$R_k = Y_k \cdot Y_k^* \quad (2)$$

Matrix $R_k$ is an e by e matrix formed by the product of matrix $Y_k$ and matrix $Y_k$* where matrix $Y_k$* is the conjugate transpose of matrix $Y_k$. Matrix or vector $Y_k$* is formed using matrix $Y_k$. The entries of matrix $Y_k$ are replaced with their complex conjugates, and the columns of the resulting matrix form the rows of matrix $Y_k$*.

Equation 3 is used to form the auto-covariance matrix of the received vectors by forming the sum of matrices $R_k$ for k=1 to L, and then dividing that summation by L.

$$R = \sum_{k=1}^{L} \frac{R_k}{L} = \frac{\sum_{k=1}^{L} Y_k \cdot Y_k^*}{L} = \begin{bmatrix} r_{1,1} & r_{1,2} & \cdot\ \cdot\ \cdot & r_{1,e} \\ r_{2,1} & & & \cdot \\ r_{3,1} & & & \cdot \\ \cdot & & & \cdot \\ \cdot & & & \cdot \\ \cdot & & & \\ r_{e,1} & & & r_{e,e} \end{bmatrix} \quad (3)$$

A singular value decomposition (SVD) is used in accordance with equation 4 to produce matrix Σ.

$$R \rightarrow U \Sigma U^* \quad (4)$$

$$\Sigma = \begin{bmatrix} \sigma_{11} & 0 & \cdot & & \cdot & 0 \\ 0 & \sigma_{22} & & & & \cdot \\ & & \cdot & & & \\ \cdot & & & \cdot & & \cdot \\ & & & & \cdot & \\ \cdot & & & \sigma_{nn} & & 0 \\ & & & & \cdot & \\ \cdot & & & & \cdot & \\ & & & & \cdot & \\ 0 & \cdot & \cdot & \cdot & 0 & \sigma_{ee} \end{bmatrix} \quad (5)$$

Singular value decomposition is well-known in the art and can be seen, for example, in Matrix Computations, pp. 16–20, by G. H. Golub and C. F. Van Loan, The John Hopkins University Press, Baltimore, Maryland 1983. A singular value decomposition may be executed using, for example, Jacobi methods, the QR algorithm or the Golub/Kahan SVD step. Matrix Σ is an e by e diagonal matrix, that is, all entries are zero except for entries on the diagonal. The entries on the diagonal of the Σ matrix are examined to determine when the magnitude of the entries significantly decrease. The point at which there is a change in the magnitude of the entries along the diagonal of the Σ matrix defines the value n which is the number of signal paths between transmitter 2 and receiver 4. In the example of FIGS. 1 and 2, n is equal to 3.

At one point along the diagonal when moving from entry l,l to entry e,e, there will be a decrease in the value of the entries. This decrease in value is used to determine n. Entry nn is the last entry to have a large value relative to entries n+1, n+1 to e,e. This change in values can be determined by simply comparing the ratios between adjacent entries on the diagonal. When a ratio becomes large relative to the ratios of prior entries on the diagonal, position n,n can be determined. This is illustrated by observing equations 6.

$$\begin{aligned} \sigma_{11}/\sigma_{22} &= \Delta_1 \\ \sigma_{22}/\sigma_{33} &= \Delta_2 \\ \sigma_{nn}/\sigma_{n+1,n+1} &= \Delta_n \end{aligned} \quad (6)$$

The ratio $\Delta_1$ is determined by dividing $\sigma_{11}$ by $\Delta_{22}$ and ratio $\Delta_2$ is determined by dividing $\sigma_{22}$ by $\sigma_{33}$. This is continued until ratio $\Delta_{nn}$ is located which is equal to $\sigma_{nn}$ divided by $\sigma_{n+1,n+1}$. This can be determined by setting a threshold. For example, when the average of the signal-to-noise ratios of the signals from the antenna elements is 30 dB or greater, a threshold of 100 may be used. In this example, $\Delta_n$ is identified as the ratio that is greater than 100. If the signal to noise ratio is less, it may be desirable to use a lower threshold. The value of n is the column or row number of the Σ matrix that contains the entry $\sigma_{nn}$.

As a result of the SVD, matrix U can be written as seen in equation 7.

$$U = \begin{bmatrix} c_{1,1} & \cdots & c_{1,n} & c_{1,n+1} & \cdots & c_{1,e} \\ c_{2,1} & & & c_{2,n+1} & \cdots & c_{2,e} \\ \cdot & & & \cdot & & \cdot \\ \cdot & & & \cdot & & \cdot \\ \cdot & & & \cdot & & \cdot \\ c_{e,1} & \cdots & c_{e,n} & c_{e,n+1} & \cdots & c_{e,e} \end{bmatrix} \quad (7)$$

The last e-n columns of the U matrix, that is, columns n+1 through e, are used to form a set of e-n polynomials. The polynomials are formed using entries from matfix U as shown in equations 8.

$$c_{1,n+1}+c_{2,n+1}z+c_{3,n+1}z^2+\ldots+c_{e,n+1}z^{e-1}=0 \quad \text{roots } P_{1,1}\rightarrow P_{1,e-1} \tag{8}$$
$$\vdots$$
$$c_{1,e}+c_{2,e}z+c_{3,e}z^2+\ldots+c_{e,e}z^{e-1}=0 \quad \text{roots } P_{e,1}\rightarrow P_{e,e-1}$$

The roots of each of the polynomials are determined using well-known methods such as the Newton iteration. The roots from polynomial 1 are labeled $P_{1,1}$ through $P_{1,e-1}$. The roots from polynomial 2 are labeled $P_{2,1}$ through $P_{2,e-1}$ and the roots from polynomial 3 are labeled $P_{3,1}$ through $P_{3,e-1}$. It is not necessary to calculate the roots for all e-n polynomials; however, calculating the roots of a larger number of polynomials reduces errors resulting from noise.

Figure 5:
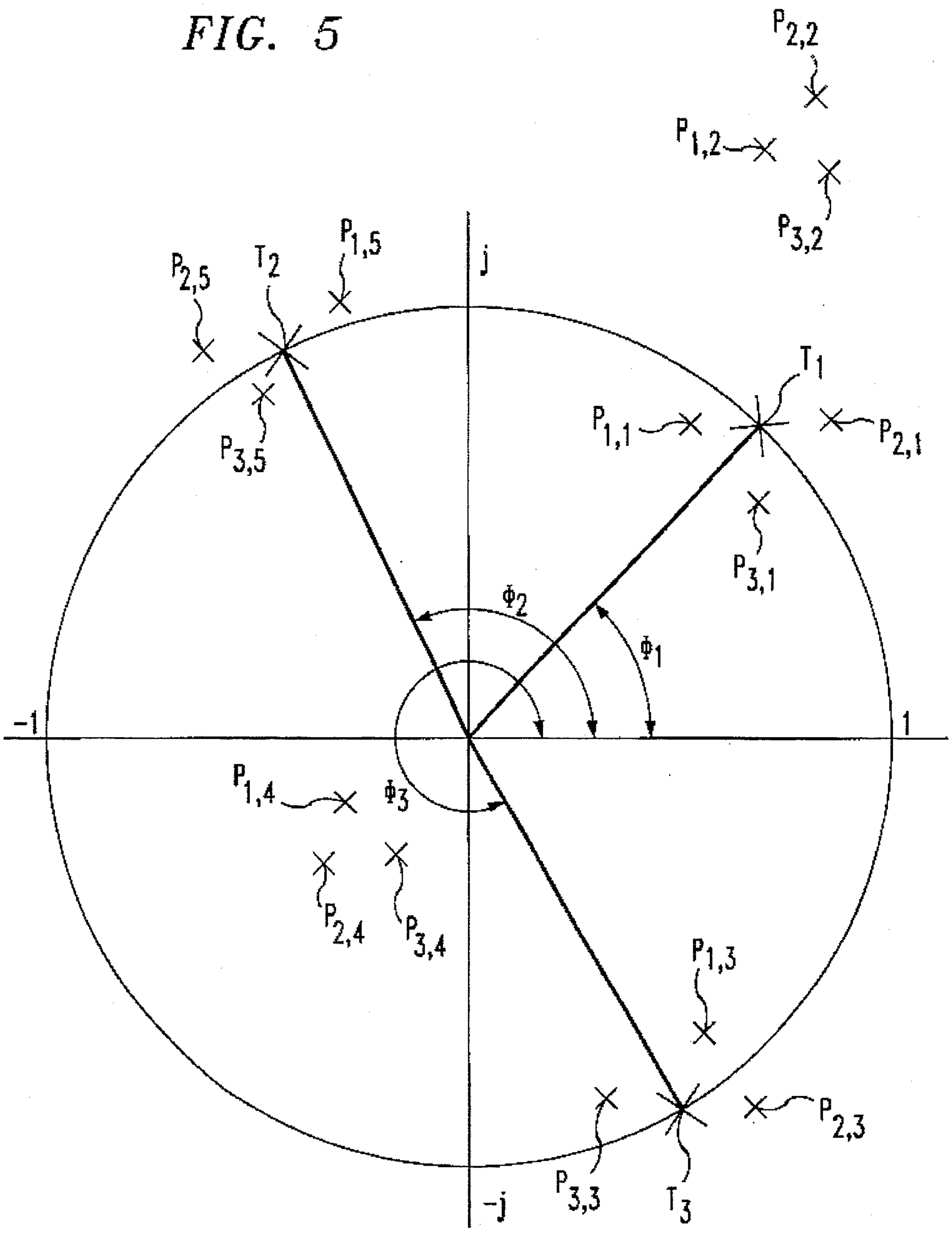

FIG. 5 illustrates a unit circle where the horizontal axis is the real axis and the vertical axis is the imaginary axis. Several roots of three polynomials are plotted. For the sake of clarity, all e-n roots of each of the three polynomials are not shown. The n roots of each polynomial that are on or close to the unit circle are the roots of interest. It should be noted that due to noise, the n roots from each of the three polynomials do not fall exactly on the unit circle, and do not coincide exactly with roots from other polynomials. As a result, there are n clusters of three roots on or near the unit circle.

The magnitude of a root, which is the square root of the sum of the squares of the real and imaginary portions of the root, is used to determine if a root is on or near the unit circle. If the root's magnitude is equal to one, the root is on the unit circle. If the root's magnitude is less than an upper threshold and more than a lower threshold, the root is considered to be near the unit circle. In situations where the average of the signal-to-noise ratios of the signals from the antenna elements is 15 dB or less, an upper threshold of 1.1 and a lower threshold of 0.9 may used. When the average of the signal-to-noise ratios is higher, a tighter set of thresholds may be used. For example, when the average of the signal-to-noise ratios is 30 dB or greater, an upper threshold of 1.05 and a lower threshold of 0.95 may be used.

After determining which groups or clusters of roots constitute the n groups that are on or near the unit circle, a point $T_m$ (m=1 to n) associated with each group of roots is found. The point $T_m$ is the point on the unit circle that is closest to a centroid for a particular group of roots. The centroid of each group of roots is calculated by using a method such as forming the average of the imaginary portions of the roots in a group, and forming the average of the real portions of the roots in a group. The imaginary average and the real average form the imaginary and real portions of the centroid, respectively.

In reference to FIG. 5, three groups of three roots ($P_{1,1}$, $P_{2,1}$, $P_{3,1}$;$P_{1,3}$,$P_{2,3}$, $P_{3,3}$; and $P_{1,5}$, $P_{2,5}$, $P_{3,5}$) are clustered near the unit circle, and can be considered on or near the unit circle. In this example there are three paths between the transmitter and receiver (n is equal to 3),therefore it is consistent that three groups of roots are on or near the unit circle. For each group of roots, a centroid is calculated to find points $T_{m=1}$ through $T_{m=n=}3$.

The relationship between points $T_m$ and angles of arrival $\theta_m$ are specified in equation 9.

$$T_m = e^{\frac{-j\omega d \sin\theta_m}{c}} \tag{9}$$

where ω is 2π times the carder frequency of the transmitted signal, d is the distance between the antenna elements and c is the speed of light. Once points $T_m$ are found, the angles of arrival are determined because the values of all of the other variables in equation 9 are known. The actual values of the angles of arrival $\theta_{m=1}$ to $\theta_{m=n=3}$ may be calculated in accordance with equation 9 to obtain the weights for beam-forming network 36; however, it is not necessary to calculate the values of the angles of arrival to calculate the weights w for beam-forming network 36. The weights corresponding to a receive beam for angle of arrival $\theta_m$ are calculated by forming matfix $A_m$ as seen in equation 10.

$$A_m = \begin{bmatrix} 1 \\ T_m \\ T_m^2 \\ T_m^3 \\ \cdot \\ \cdot \\ \cdot \\ T_m^{e-1} \end{bmatrix} \tag{10}$$

Matrix $A_m$ is used in acconlance with equation 11 to form weight matrix $W_m$ which contains the weights to produce a receive beam corresponding to angle of arrival $\theta_m$.

$$W_m = \begin{bmatrix} w_{m,1} \\ w_{m,2} \\ \cdot \\ \cdot \\ \cdot \\ w_{m,e} \end{bmatrix} = \frac{R^{-1}A_m}{A_m{}^*R^{-1}A_m} \tag{11}$$

where $R^{-1}$ is the inverse of the auto-covariance matrix R in equation 3, and $A^*_m$ is the $A^*_m$ conjugate transpose of $A_m$. When m=1, weights $W_{1,1}$, $W_{1,2}$, through $W_{1,e}$ are the entries of matrix $W_{m=1}$. Here weights are provided to multipliers 52 of FIG. 4 to form a receive beam corresponding to angle of arrival $\theta_{m=1}$. Likewise, when m=2, weights $W_{2,1}$ through $W_{2,e}$ are provided to multipliers 56 of FIG. 4 to form a receive beam corresponding to angle of arrival $\theta_{m=2}$.

After determining the weights for each angle of arrival, processor 38 provides the weights to beam-forming network 36 so that a receive beam is formed for each of the angles of arrival. As a result, the signal on each path between transmitter 2 and receiver 4 is received by a separate receive beam. The output from each receive beam is passed to signal processor 40. Signal processor 40 picks the strongest of the signals, that is the signal with the highest signal-to-noise ratio, and passes the signal to the output. It is also possible to correlate each of the weaker signals with the strongest signal to determine the time misalignment between the weaker signals and the stronger signal. Once the misalignment is known, the signals can be time aligned and added to increase the signal-to-noise ratio of the output signal. The signals from each of the beams should be time aligned because each beam receives a signal that has traveled over a different distance and therefore, took a different amount of time to travel from transmitter 2 to receiver 4.

The correlation is carried out by correlating the data or symbols in the strongest signal with the data or symbols in the weaker signals. It is also possible to correlate the signals by correlating a training sequence in the stronger signal with the training sequences in the weaker signals. It should be noted that a training sequence is not required and that the present invention can determine the number of signal paths and compensate for them blindly, that is, without a training sequence.

It should also be noted that for time aligning signals, it is desirable that A/D 34 sample at least eight times the symbol or data rate, and that for the purposes of determining signal paths and their angles of arrival, it is sufficient for A/D 34 to sample at two times the symbol or data rate.

Figure 7:
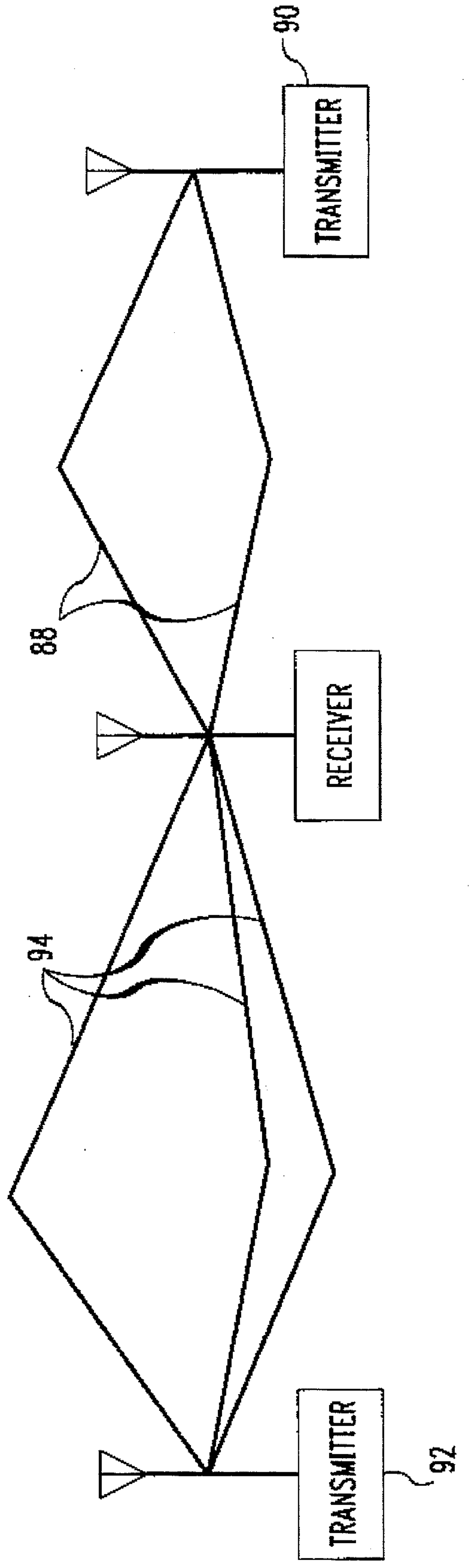
FIG. 7 illustrates a communication system with more than one transmitter.
Figure 8:
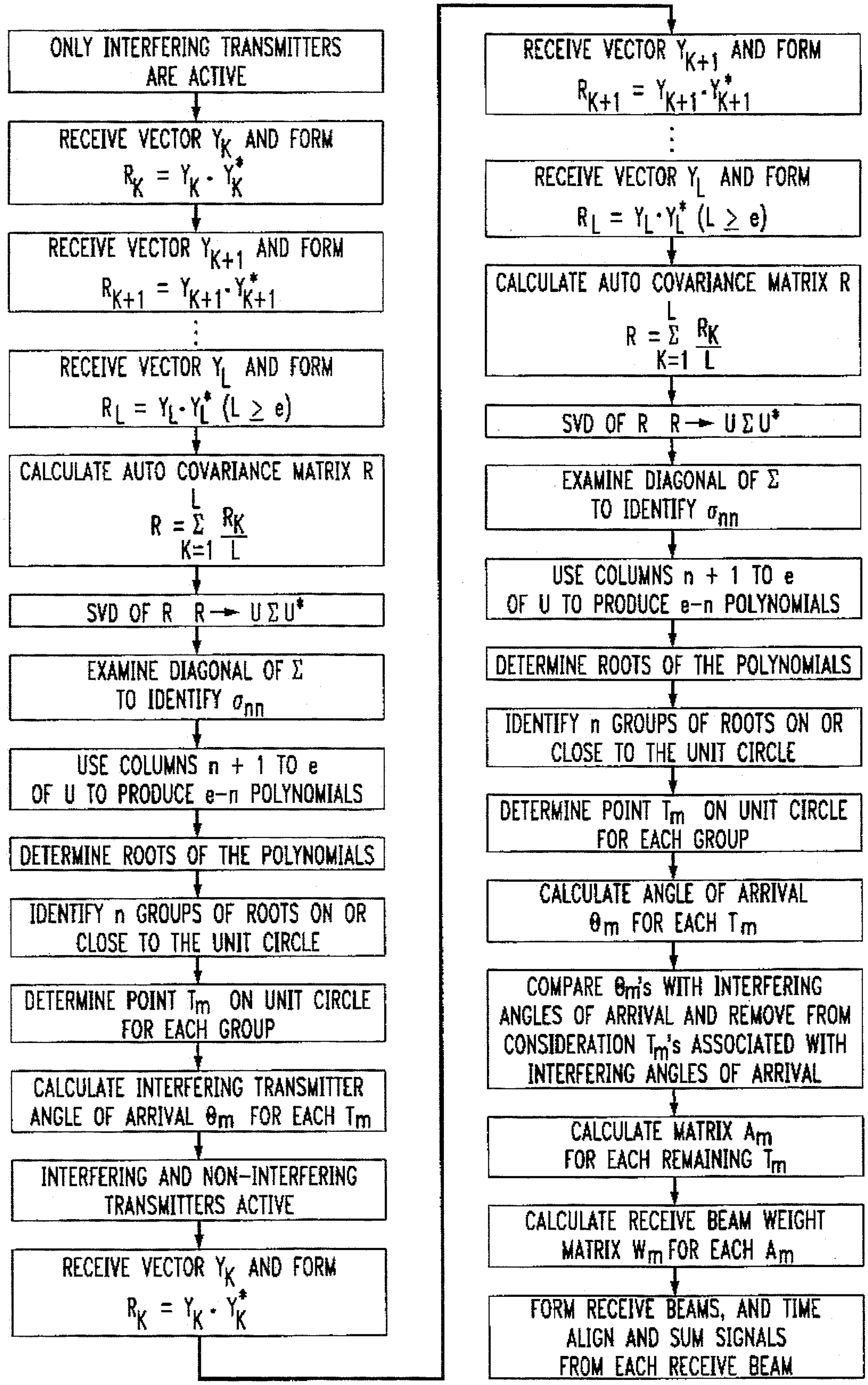
FIG. 8 is a flow diagram illustrating compensating for inter-transmitter interference.

FIG 7 illustrates a communication system where more than one transmitter is used to transmit on the same frequency or channel, such as in a cellular communication system, the present invention may be used to compensate for inter-transmitter or inter-cell interference. Intertransmitter interference occurs when the signal from the transmitter of interest, which in a cellular system is the transmitter associated with the cell within which the receiver is located, is corrupted by signals received from one or more other transmitters (interfering transmitters). The interference is decreased by eliminating signals that are from an interfering transmitter. This is eartied out by determining the signal paths and angles of arrival in two steps. The first step involves determining the signal paths and angles of arrival associated with signals 88 from interfering transmitter(s) 90 or cell(s), before the transmitter 92 or cell of interest begins transmitting the signal 94 to be received. After determining the angles of arrival associated with the interfering cell(s) or transmitter(s), the signal paths and angles of arrival are determined while receiving signals from both the cell of interest and the interfering cell(s). After determining all of the angles of arrival, receive beams are not formed for the angles of arrival previously identified as coming from an interfering cell(s), and receive beams are formed for angles of arrival associated with signals coming from the cell of interest. This process is illustrated in FIG. 8.

The present invention may also decrease inter-transmitter interference in broadband communication systems, such as CDMA (code division multiple access) systems. In a CDMA system, a received signal is correlated with a pseudo-random code to eliminate a signal from an interfering transmitter; however, when the interfering transmitter is particularly strong, the interfering signal may not be eliminated by the correlation. As described above, the signal from the interfering transmitter can be reduced or eliminated by forming receive beams that correspond to the desired signal and by not forming receive beams that correspond to the interfering signal.

Figure 6:
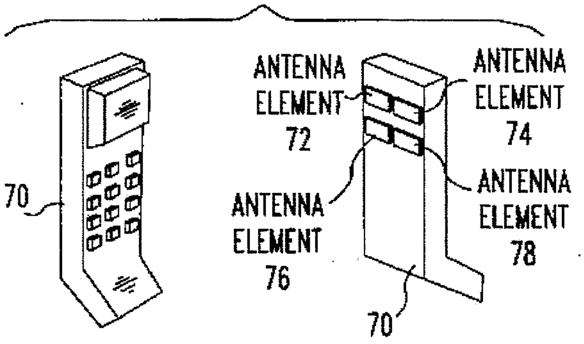

FIG. 6 illustrates a front and rear view of cellular telephone 70. The front view illustrates a display and keypad. The rear view illustrates a multi-element antenna with elements 72, 74, 76 and 78. Cellular telephone 70 uses the antenna elements to form receive beams that correspond to angles of arrival in accordance with the above-described techniques. The receive beams may be used to receive a signal from one or more signal paths, and they may be used to reduce inter-cell or inter-transmitter interference.

Telephone 70 may be provided with many other antenna configurations. The telephone may use additional elements in the same configuration as FIG. 6, or elements in a different configuration. It is also possible to use a multi-element antenna that is remote from a telephone, for example, telephone 70 may be in communication with a multi-element antenna mounted on an automobile.

What is claimed:

1. A method of receiving communication signals in a multi-path environment, comprising the steps of:

receiving a plurality of signals having a plurality of angles of arrival using a plurality of antenna elements, said plurality of elements providing a plurality of element signals;

sampling said plurality of element signals at a first time to form a first sample set and sampling said plurality of element signals at a second time to form a second sample set, said first and said second sample sets belonging to a plurality of sample sets having at least two sample sets;

using said plurality of sample sets to calculate at least a first and a second set of weights, said first set of weights being used to form a first receive beam corresponding to a first angle of arrival and said second set of weights being used to form a second receive beam corresponding to a second angle of arrival, said first and second angles of arrival belonging to said plurality of angles of arrival; and time aligning and summing a first beam signal and a second beam signal by correlating a sequence in said first beam signal with the same sequence contained in said second beam signal, said first beton signal received by said first receive beam and said second beam signal received by said second receive beam, said first and second beam signals belonging to said plurality of signals.

2. A method of receiving communications signals while reducing intertransmitter interference, comprising the steps of:

using a plurality of antenna elements to receive a first plurality of signals from a first transmitter while a second transmitter is not transmitting, said plurality of elements providing a first plurality of element signals and said first plurality of signals having a first plurality of angles of arrival;

sampling said first plurality of element signals at a first time to form a first sample set and sampling said first plurality of element signals at a second time to form a second sample set, said first and said second sample sets belonging to a first plurality of sample sets having at least two sample sets;

using said first plurality of sample sets to calculate a first angle of arrival belonging to said first plurality of angles of arrival;

using said plurality of antenna elements to receive a second plurality of signals comprising first signals from said first transmitter and second signals from said second transmitter, said plurality of elements providing a second plurality of element signals and said second plurality of signals having a second plurality of angles of arrival;

sampling said second plurality of element signals at a third time to form a third sample set and sampling said second plurality of element signals at a fourth time to form a fourth sample set, said third and said fourth sample sets belonging to a second plurality of sample sets having at least two sample sets;

using said second plurality of sample sets to calculate at least a first and a second set of weights, said first sets of weights being used to form a first receive beam corresponding to a second angle of arrival and said second set of weights being used to form a second receive beam corresponding to a third angle of arrival, said second and third angles of arrival belonging to said second plurality of angles of arrival and not being equal to said first angle of arrival; and time aligning and summing a first beam signal and a second beam signal by correlating a sequence in said first beam signal with the same sequence contained in said second beam signal, said first beam signal received by said first receive beam and said second beam signal received by said second receive beam, said first and second beam signals belonging to said second plurality of signals.

* * * * *